United States Patent
Furlani et al.

[11] Patent Number: 5,865,298
[45] Date of Patent: Feb. 2, 1999

[54] MAGNETIC TRANSPORT SYSTEM

[75] Inventors: Edward P. Furlani; Dilip K. Chatterjee; Syamal K. Ghosh, all of Rochester, N.Y.

[73] Assignee: Eastman Kodak Company, Rochester, N.Y.

[21] Appl. No.: 901,185

[22] Filed: Jul. 28, 1997

[51] Int. Cl.[6] ............................ B65G 15/58; B01D 35/06
[52] U.S. Cl. ...................... 198/805; 198/690.1; 210/695; 210/222; 210/223; 492/49; 492/53; 492/56
[58] Field of Search ................................. 198/690.1, 805; 210/695, 222, 223; 492/49, 53, 56

[56] References Cited

U.S. PATENT DOCUMENTS

| | | |
|---|---|---|
| 3,437,074 | 4/1969 | Hagopian et al. ................. 198/690.1 |
| 3,646,651 | 3/1972 | McGaughey et al. .................... 492/53 |
| 5,257,966 | 11/1993 | Watanabe et al. ........................ 492/53 |

*Primary Examiner*—William E. Terrell
*Assistant Examiner*—Mark Deuble

[57] ABSTRACT

A magnetic transport system (8) has at least one magnetic transport roller (20) mounted to a frame (10) for conveying a ferromagnetic web (12). The transport roller (20) has a magnetic core (22), a first bonding layer (24) at least partially surrounding and bonded to the core (22), a first layer (26) at least partially surrounding and bonded to the first bonding layer (24), a second bonding layer (28) for bonding second layer (30) to the core (20). Second layer (30) comprises a wear and abrasion resistant material. Further, a ferromagnetic web (12) is arranged for movement along the magnetic transport roller (20) for transporting materials thereon.

16 Claims, 3 Drawing Sheets

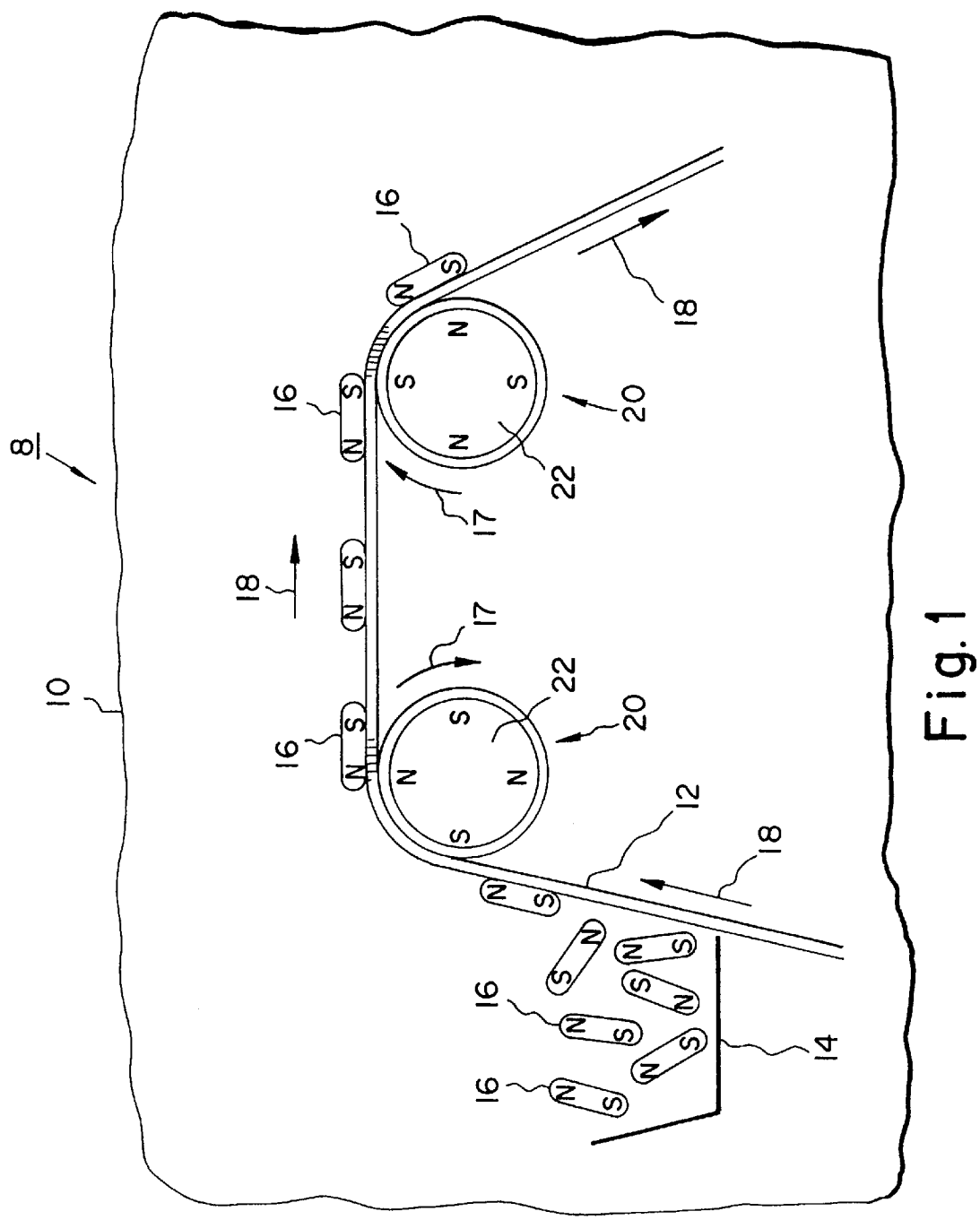

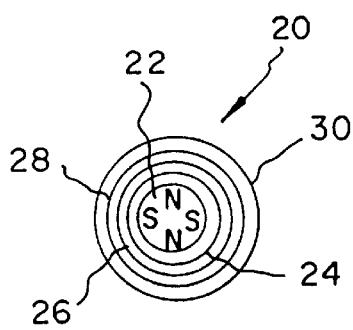
Fig. 2b
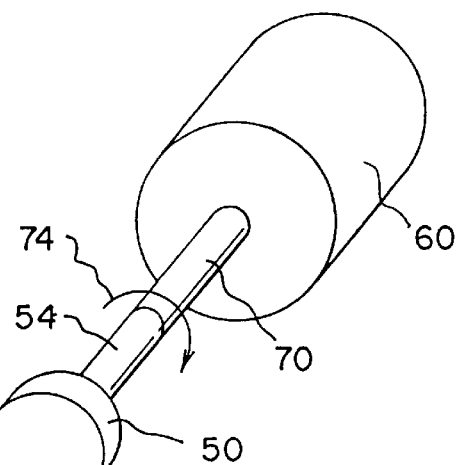
Fig. 2a
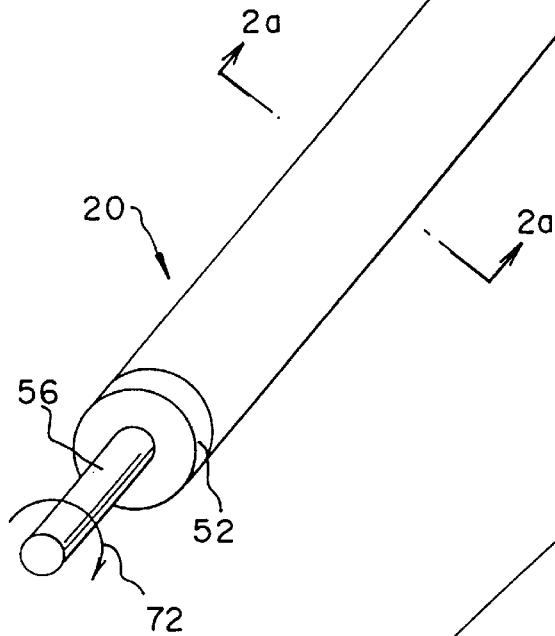
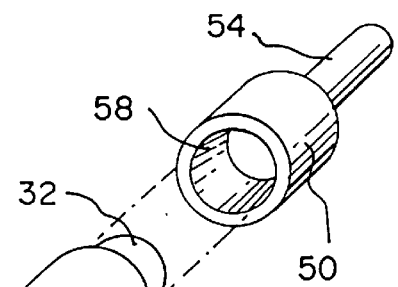
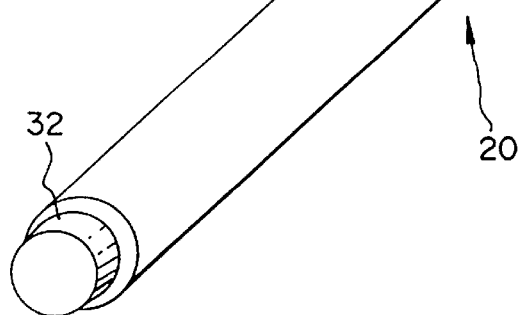
Fig. 3

MAGNETIC TRANSPORT SYSTEM

FIELD OF THE INVENTION

The invention relates to the transportation of magnetic parts and materials, more particularly, the invention concerns a magnetic transport system for transporting ferromagnetic materials.

BACKGROUND OF THE INVENTION

Material transport systems comprising a web and transport rollers are used extensively in manufacturing processes to transport components, more specifically, ferromagnetic components, from one station to the next. In numerous manufacturing processes, the transport system is exposed to abrasive or corrosive environments. For example, in the electroplating painting and encapsulation of magnets, pretreatment processes such as cleaning, and surface etching entail the exposure of the transport system and transported components to abrasive particles and corrosive chemicals. Conventional webs are transport rollers degrade when exposed to corrosive or abrasive environments. The premature degradation of the these transport system components in harsh environments causes damage to the transported materials and requires costly and time consuming maintenance for web and roller repair and replacement. Therefore, a need exists to design and manufacture a novel transport system which can effectively transport ferromagnetic components without damage either to the transport system or to the components being transported. The subject of this disclosure is a wear, abrasion and corrosion resistant magnetic transport rollers and ferromagnetic transport webs for use in a abrasive and corrosive manufacturing environment.

SUMMARY OF THE INVENTION

It is, therefore, one object of the invention to provide a magnetic transport system that is capable of transporting magnetic materials in a corrosive environment.

It is another object of the invention to provide a magnetic transport system that is wear and abrasion resistant.

Yet another object of the invention is to provide a magnetic transport system that utilizes magnetic coupling between a magnetic roller and a ferromagnetic web for transporting magnetic materials and components.

It is a feature of the invention that a magnetic roller, in rotating contact with a ferromagnetic web, has multiple layers including a corrosion resistant layer and a wear and abrasion resistant layer surrounding a magnetic core.

To solve one or more of the problems above, there is provided, in one aspect of the invention, a magnetic transport system includes a frame and at least one transport roller mounted to the frame. The transport roller has a magnetic core and a first bonding layer at least partially surrounding and bonded to the core. Further, a first layer, comprising a corrosion resistant material, at least partially surrounds and is bonded to the first bonding layer of the roller. A second bonding layer is provided that at least partially surrounds and is bonded to the first layer. A second layer, comprising a wear and abrasion resistant material, at least partially surrounds and is bonded to the second bonding layer. Moreover, a web comprising a ferromagnetic material for magnetically adhering to the roller, is arranged for movement along the transport roller. At least a portion of the web is in rotating contact and is magnetically coupled to the roller. A drive means is provided for rotating the transport roller so that the web moves along the roller under the influence of a magnetic couple.

It is therefore an advantageous effect of the present invention that materials can be transported in a corrosive environment without degradation of the transport system. It is a further advantage of the invention that the transport system does not impart undesirable wear or abrasion to the materials being transported. Moreover, it is a further advantage of the invention that materials can be transported in a variety of orientations without the concerns for adverse gravitational effects.

BRIEF DESCRIPTION OF THE DRAWINGS

The above mentioned and other objects, features and advantages of the invention and the manner of attaining them will become more apparent and the invention itself will be better understood by reference to the following description of an embodiment of the invention taken in conjunction with the accompanying drawings, wherein:

FIG. 1 is a schematic view of the web transport system of the present invention;

FIG. 2a is a perspective view of the transport roller with an attached motor drive;

FIG. 2b is a cross-sectional view taken along line 2a—2a of FIG. 2a;

FIG. 3 is perspective view of the magnetic roller and end shaft member of the invention;

FIG. 4b is a cross-sectional view taken along line 4a–4a of FIG. 4a.

DETAILED DESCRIPTION OF THE INVENTION

Figure 4A:
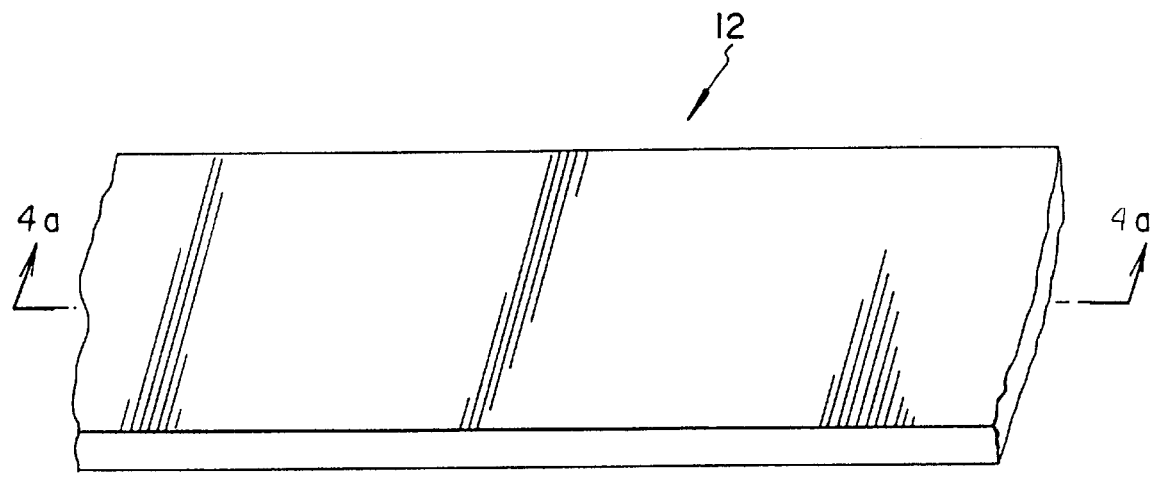
FIG. 4a is a perspective view of the web of the present invention.

Referring to FIG. 1, a schematic view is shown of a magnetic transport system 8 of the present invention comprising a frame 10, a ferromagnetic web 12, a portion of which is in close proximity to a reservoir 14 of magnetically polarized components 16, a plurality of transport rollers 20 which have respective permanent magnet cores 22, and are mounted on said frame 10 for rotation about their longitudinal axis, and are driven by motors 60 (shown in FIG. 2a). The magnetic cores 22 are made from a permanent magnet material, and are polarized with a plurality of radially disposed surface poles of alternating polarity around their circumference. The web 12, which is a ferromagnetic multilayer web, comprises a ferromagnetic base layer 76 (shown in FIG. 4b). The magnetically polarized components 16 attract and adhere to the portion of web 10 that is in close proximity to the reservoir 12. The portion of the web 12 that is in contact with the rollers 20 is attracted to the rollers 20 due to the force of attraction between the permanent magnet cores 22 and the ferromagnetic base layer 76 of the web 12 (shown in FIG. 4b). Thus, when the motors 60 (shown in FIG. 2a) rotate the rollers 20 as indicated by rotation arrows 17, the web 12 is translated by the transport rollers 20 as indicated by arrows 18 and moves the attached magnetically polarized components 16 as shown. The magnetically polarized components 16 can be removed from the web 12 at a desired location by use of an electromagnet (not shown) as is well known.

Referring to FIG. 2a, a perspective is shown of the transport roller 20 with end support members 50 and 52 with shaft portions 54 and 56, respectively, which are shrunk fit onto the ends of rollers 20, and a motor 60 with rotor shaft 70. The shaft portion of 524 of end support member 50 is fixedly attached to rotor shaft 70 of motor 60. The roller 20 is free to rotate about its longitudinal axis, and when motor 60 rotates it causes rotation of roller 20 as indicated by rotation arrows 72 and 74. The end support members 50 and 52 are made from AISI 316 stainless steel, wherein the shaft portions 54 and 56 are electroplated with teflon impregnated nickel so as to reduce the coefficient of friction as it rotates in side a stationary bushing (not shown).

Referring to FIG. 2b, the roller 20 is shown in cross-sectional view of FIG. 2a. Roller 20 comprises a magnetic core 22. Core 22 is made preferably from a non rare-earth permanent magnet material such as aluminum-nickel-cobalt, barium-ferrite, copper-nickel-iron alloy, iron-cobalt-molybdenum alloy. Most preferred of the non rare-earth materials is aluminum-nickel-cobalt. Core 22 may also be made of a rare-earth material such as neodymium-iron-born, or samarium-cobalt. In this instance, the most preferred material is neodymium-iron-boron manufactured by Magnaquench, Inc., of Indiana.

Referring to FIGS. 1 and 2b, it is important to our invention that the core 22 is polarized with a plurality of radially disposed surface poles of alternating polarity around its circumference.

Referring again to FIG. 2b, in addition to magnetic core 22, roller 20 comprises first and second layers 26, 30 surrounding the core 22. Layers 26,30 are preferably coated onto the core 22 using the techniques described below. According to our preferred embodiment, a first bonding layer 24 is coated onto the core 22. First bonding layer 24 is preferably comprised of copper or copper based alloys, chromium, gold, silver and combinations thereof. Most preferred is copper and its alloys. Skilled artisans will appreciate that bonding layer 24 may be applied to core 22 by using any of several conventional techniques. We, however, prefer depositing the first bonding layer 24 onto core 22 using physical vapor deposition (PVD), chemical vapor deposition (CVD), or some electroless or electrolytic deposition process, each producing substantially the same result. Preferably, we deposited first bonding layer 24 onto core 22 using an electrolytic deposition process. In the preferred embodiment, first bonding layer 24 has a thickness in the range of about 50 to 200 Angstroms, preferably 100 Angstroms.

Referring once again to FIG. 2b, after the first bonding layer 24 is bonded to core 22, a first layer 26 comprising a corrosion resistant material, is coated onto the first bonding layer 24. First layer 26 comprises preferably a coating of electroplated nickel or electroless nickel. The preferred method for depositing the first layer 26 of corrosion resistant material onto first bonding layer 24 is electroless plating. The first bonding layer 24 functions to enhance the adhesion of the first layer 26 of corrosion resistant material to the core 22. Preferably, first layer 26 has a thickness between 0.1 mil and 1 mil, most preferred being 0.5 mil.

According to FIG. 2b, a second bonding layer 28 is coated onto first layer 26. The second bonding layer comprises alloys of nickel-aluminum, nickel-chromium, cobalt-chromium-aluminum or combinations thereof. While numerous techniques may be used to deposit the second bonding layer 28, we prefer using a PVD or a plasma spraying. Preferably, the second bonding layer 28 has a thickness in the range of about 1,000 to 10,000 Angstroms, most preferred being 5,000 Angstroms.

Still referring to FIG. 2b, a second layer 30 comprising a wear and abrasion resistant material, is coated onto the second bonding layer 28. The second bonding layer 28 enhances the adhesion and minimizes the porosity of the second layer 30 by sealing pores (not shown) in the second layer 30. The preferred method for coating the second layer 30 onto the second bonding layer 28 is by dipping the roller 20 in solutions of polyurethane or acrylic. Alternatively, the second layer 30 may be spin or dip coated onto the second bonding layer 28 of roller 20 in a solution of sol-gel comprising silicon dioxide or alumina. Yet another acceptable technique for coating the second layer 30 onto the second bonding layer 28 is thermal or plasma spraying with a wear and abrasion resistant material such as chromium oxide, zirconium oxide, aluminum oxide, or composites of zirconia-alumina, or a combination thereof.

Referring to FIGS. 2a and 3, a perspective view is shown of the roller 20 having similarly tapered ends 32 and an end support member 50, 52 mounted on either of the tapered ends 32. End support members 50, 52 have an opening 58 for receiving the tapered end 32 of roller 20. Preferably, end support members 50, 52 are fixedly attached to a tapered end 32 of roller 20 by shrink fitting or alternatively by press fitting.

Referring to FIG. 4a, a perspective is shown of the flexible magnetic multilayer web 12.

Figure 4B:
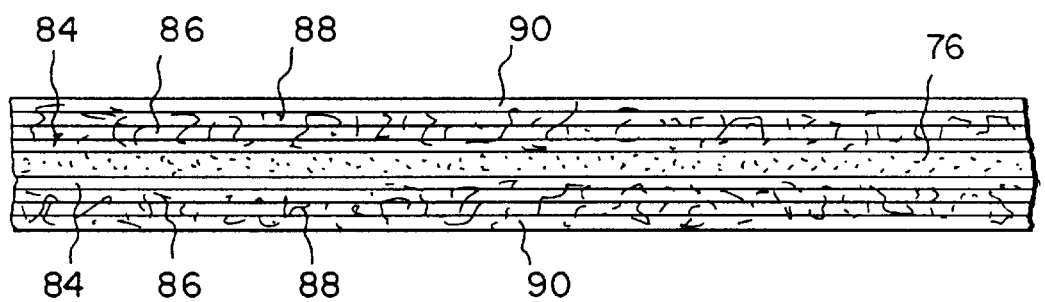

Referring to FIG. 4b, the web 12 is shown in cross-sectional view taken along line 4a—4a of FIG. 4a. The web 12 comprises a ferromagnetic base layer 76. The ferromagnetic base layer 76 is flexible and comprises soft-magnetic particles embedded in a binder. Specifically, soft ferrites of the general formula $MOFe_2O_3$, where M is a divalent metal such as Mg, Mn, Ni etc. are mixed in a binder system for manufacture of the base layer 76. The binder system essentially consists of organic materials such as cellulose acetate, Kevlar™ (manufactured by DuPont), nylon etc. The dispersion of the soft magnetic particles in the binder system is known in the art. The dispersed magnetic particles are formed into a web either by knife coating or by extrusion or by any suitable means known in the art such as tape casting.

In an alternate embodiment, the base layer 76 can also be formed on a flexible non-magnetic metal or alloy substrate such as austenitic stainless steel of 1 to 10 mil in thickness. Soft magnetic material can be plasma or thermally sprayed on the flexible substrate using a suitable bond layer known in the art. Deposition of soft magnetic materials can also be made on the flexible substrate through physical vapor deposition (PVD), or chemical vapor deposition (CVD).

Referring again to FIG. 4b, in addition to the ferromagnetic base layer 76, the web 12 comprises first and second web layers 86 and 90, respectively surrounding the ferromagnetic base layer 76. Web layers 86 and 90 are preferably coated onto the ferromagnetic base layer 76 using the techniques described below. According to our preferred embodiment, the first web bonding layer 84 is coated onto the ferromagnetic base layer 76. First web bonding layer 84 is preferably comprised of copper or copper based alloys, chromium, gold, silver and combinations thereof. Most preferred is copper and its alloys. Skilled artisans will appreciate that the first web bonding layer 84 may be applied to ferromagnetic base layer 76 by using any of several conventional techniques. We, however, prefer depositing the first web bonding layer 84 onto ferromagnetic base layer 76 using physical vapor deposition (PVD), chemical vapor deposition (CVD), or some electroless or electrolytic deposition process, each producing substantially the same result. Preferably, we deposited the first web bonding layer 84 onto the ferromagnetic base layer 76 using an electrolytic deposition process. In the preferred embodiment, first web bonding layer 84 has a thickness in the range of about 50 to 200 Angstroms, preferably 100 Angstroms.

Referring once again to FIG. 4b, after the first web bonding layer 84 is bonded to the ferromagnetic base layer 76, a first web layer 86 comprising a corrosion resistant material, is coated onto the first web bonding layer 84. The first web layer 86 comprises preferably a coating of electroplated nickel or electroless nickel. The preferred method for depositing the first web layer 86 of corrosion resistant material onto the first web bonding layer 84 is electroless plating. The first web bonding layer 84 functions to enhance the adhesion of the first web layer 86 of corrosion resistant material to the ferromagnetic base layer 76. Preferably, the first web layer 86 has a thickness between 0.1 mil and 1 mil, most preferred being 0.5 mil.

According to FIG. 4b, a second web bonding layer 88 is coated onto first web layer 86. The second web bonding layer 88 comprises alloys of nickel-aluminum, nickel-chromium, cobalt-chromium-aluminum or combinations thereof. While numerous techniques may be used to deposit the second web bonding layer 88, we prefer using PVD or a plasma spraying. Preferably, the second web bonding layer 88 has a thickness in the range of about 1,000 to 10,000 Angstroms, most preferred being 5,000 Angstroms.

Still referring to FIG. 4b, a second web layer 90 comprising a wear and abrasion resistant material, is coated onto the second web bonding layer 88. The second web bonding layer 88 enhances the adhesion and minimizes the porosity of the second web layer 90 by sealing pores (not shown) in the second web layer 90. The preferred method for coating the second web layer 90 onto the second web bonding layer 88 is by dipping the web 12 in solutions of polyurethane or acrylic. Alternatively, the second web layer 90 may be spin or dip coated onto the second bonding layer 88 of the web 12 in a solution of sol-gel comprising silicon dioxide or alumina. Yet another acceptable technique for coating the second web layer 90 onto the second web bonding layer 88 is thermal or plasma spraying with a wear and abrasion resistant material such as chromium oxide, zirconium oxide alumina, or composites of zirconia-alumina, or a combination thereof.

While the invention has been described with a certain degree of particularity, it is manifest that many changes may be made in the details of the construction and the arrangement of the components without departing from the spirit and scope of the disclosure. It is understood that the invention is not limited to the embodiments set forth herein for purposes of exemplification, but is to be limited only by the scope of the attached claims, including the full range of equivalency to which each element thereof is entitled.

PARTS LIST 8 magnetic transport system
10 frame
12 web
14 reservoir
16 magnetically polarized components
17 rotation arrows
18 arrows
20 roller
22 core
24 first bonding layer
26 first layer
28 second bonding layer
30 second layer
32 tapered end
50 end support member
52 end support member
54 shaft portion
56 shaft portion
58 opening
60 motor
70 rotor shaft
72 rotation arrow
74 rotation arrow
76 ferromagnetic base layer
84 first web bonding layer
86 first web layer
88 second web bonding layer
90 second web layer

What we claim is:

1. A magnetic transport system, comprising;
a frame;
at least one transport roller mounted to said frame, said roller comprising a magnetic core; a first bonding layer at least partially surrounding and bonded to said core; a first layer at least partially surrounding and bonded to said first bonding layer, said first layer comprising a corrosion resistant material; a second bonding layer at least partially surrounding and bonded to said first layer; a second layer at least partially surrounding and bonded to said second bonding layer, said second layer comprising a wear and abrasion resistant material;
a web arranged for movement along said transport roller, said web comprising a ferromagnetic material for magnetically adhering to said roller, said roller and at least a portion of said web in contact with said roller being magnetically coupled thereto; and,
means for rotating said transport roller so that said web moves along said roller due to said magnetic coupling.

2. The system recited in claim 1, wherein said web comprises a ferromagnetic base layer; a first web bonding layer at least partially surrounding and bonded to said ferromagnetic base layer; a first web layer at least partially surrounding and bonded to said first web bonding layer, said first web layer comprising a corrosion resistant material; a second web bonding layer at least partially surrounding and bonded to said first web layer; a second web layer at least partially surrounding and bonded to said second web bonding layer, said second web layer comprising a wear and abrasion resistant material.

3. The transport system recited in claim 1 wherein said magnetic core is made from a permanent magnet material, said permanent magnet material being polarized with a plurality of radially disposed surface poles of alternating polarity around its circumference.

4. The transport system recited in claim 3 wherein said permanent magnet material is a rare-earth magnetic material selected from the group consisting of:
(a) neodymium-iron-boron;
(b) samarium-cobalt; and,
(c) mixture thereof.

5. The transport system recited in claim 3 wherein said permanent magnet material is a non rare-earth magnetic material selected from the group consisting of:
(a) aluminum-nickel-cobalt alloys;
(b) barium-ferrite;
(c) copper-nickel-iron alloy;
(d) iron-cobalt-molybdenum alloy; and
(e) mixture thereof.

6. The transport system recited in claim 1, wherein said first bonding layer is selected from the group consisting of:
(a) copper; (b) copper based alloys; (c) chromium; (d) gold; (e) silver; and (f) a mixture thereof.

7. The transport system recited in claim 1, wherein said corrosion resistant material is electroplated nickel or electroless nickel.

8. The transport system recited in claim 1, wherein said second bonding layer is selected from the group consisting of: (a) alloys of nickel-aluminum; (b) alloys of nickel-chromium; (c) alloys of cobalt-chromium-aluminum; or a mixture thereof.

9. The transport system recited in claims 1 and 2, wherein said wear and abrasion resistant materials is selected from the group consisting of: (a) polyurethane; (b) acrylic; (c)silicon dioxide; (d) alumina; (e) chromium oxide; (f) zirconium oxide; (g) composites of zirconia-alumina; or a mixture thereof.

10. The transport system recited in claim 2 wherein said base layer is made from a binder having dispersed soft-magnetic particles arranged therein.

11. The transport system recited in claim 10, wherein said soft magnetic particles are soft ferrites of the general formula $MOFe_2O_3$, wherein M is a divalent metal selected from the group consisting of: (a) magnesium, (b) manganese, (c) nickel, and (d) a mixture thereof.

12. The transport system recited in claim 2 wherein said base layer is deposited on a flexible nonmagnetic substrate.

13. The transport system recited in claim 1, wherein said first web bonding layer is selected from the group consisting of: (a) copper; (b) copper based alloys; (c) chromium; (d) gold; (e) silver; and (f) a mixture thereof.

14. The transport system recited in claim 1, wherein said first web layer of corrosion resistant material is electroplated nickel or electroless nickel.

15. The transport system recited in claim 1, wherein said second web bonding is selected from the group consisting of: (a) alloys of nickel-aluminum; (b) alloys of nickel-chromium; (c) alloys of cobalt-chromium-aluminum; or a mixture thereof.

16. The transport system recited in claim 1, wherein the second web layer of wear resistant materials is selected from the group consisting of: (a) polyurethane; (b) acrylic; (c)silicon dioxide; (d) alumina; (e) chromium oxide; (f) zirconium oxide; (g) composites of zirconia-alumina; or a mixture thereof.

* * * * *